United States Patent Office 2,885,389
Patented May 5, 1959

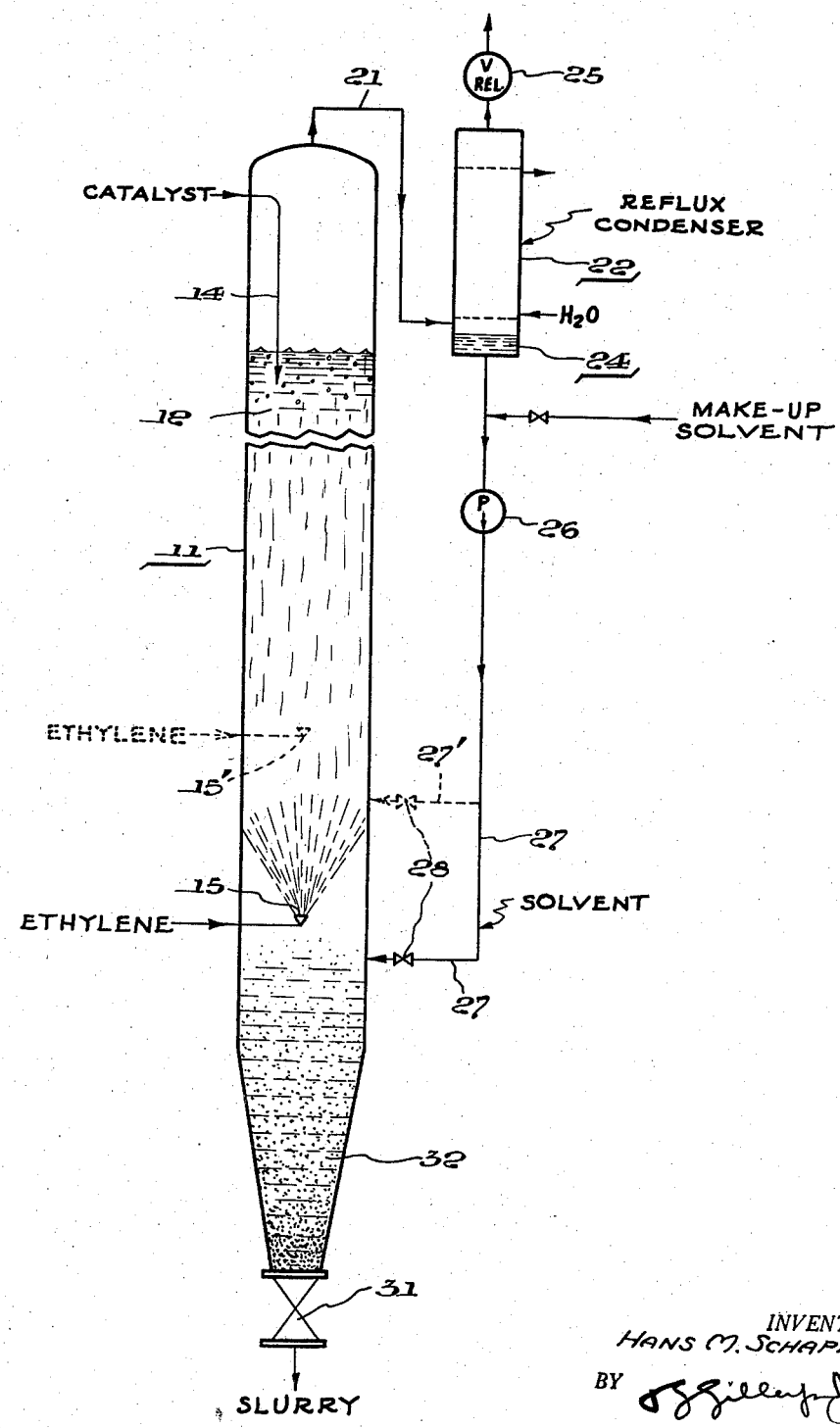

2,885,389

POLYMERIZATION PROCESSES

Hans M. Schappert, Pittsburgh, Pa., assignor to Koppers Company, Inc., a corporation of Delaware Application July 5, 1955, Serial No. 519,960

15 Claims. (Cl. 260—94.9)

This application is concerned with a process for the polymerization of ethylene. More particularly, the application is concerned with a process for the polymerization of ethylene in the presence of a catalyst which is a mixture of (A) and (B) in which (A) has the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl and aryl radicals, halogen atoms, alkyloxy radicals, aryloxy radicals, secondary amino radicals, secondary acid amide radicals, mercapto radicals, thiophenyl radicals, radicals of carboxylic acids and radicals of sulfonic acids, and in which (B) is a compound of a metal selected from the group consisting of metals of group IV-B, V-B, and VI-B of the Periodic System including thorium and uranium at temperatures under the decomposition temperature of the particular catalyst, that is in the order of 100° C. and at pressures of less than 100 atmospheres. As used herein the term "catalyst" is intended to embrace the admixture of components (A) and (B) as aforedescribed as well as the mixture obtained by separate and simultaneous addition of components (A) and (B) into a reaction zone. In those instances in which the catalyst components are liquid, they are conveniently introduced as such. Otherwise, suitably these components are slurried or dissolved in the same inert solvent which is used as a reaction medium as hereinafter described such as, for example, pentane, cyclopentane, hexane, cyclohexane, heptane, cycloheptane, octane, cyclooctane, nonane, decane, benzene, xylene, decahydronaphthalene, dibutylether, and the like. Particularly useful in the process of this invention are those inert organic solvents which have a density at reaction temperature in the range of 0.55–0.90.

It is known, as disclosed in Ziegler Belgian Patent 533,362 issued May 16, 1955, to polymerize ethylene in the presence of the aforementioned catalysts. Conveniently this is accomplished by preparing a mixture of the catalyst and a liquid inert solvent and introducing ethylene below the liquid level while stirring.

It has been discovered that this type of polymerization can be carried out in the hereinafter described manner to obtain heretofore unknown results. Broadly, the present invention comprises a process for the polymerization of ethylene in a reaction zone containing a boiling inert solvent comprising continuously adding catalyst to the upper portion of said zone to flow downwardly therethrough; continuously and simultaneously therewith introducing ethylene below the surface of said inert solvent to flow countercurrently to the flow of said catalyst; maintaining a liquid level in the reaction zone above the lowest point of ethylene introduction at a distance of at least four times the equivalent diameter of the cross-sectional area of the zone in the plane of said lowest point of ethylene introduction; removing polyethylene from the bottom of said zone and in which the catalyst is as above described.

In a further advantageous embodiment of the invention the height of liquid above the highest point of ethylene introduction is maintained by introducing inert solvent into the reaction zone at a point below the lowest point of ethylene introduction whereby catalyst is removed from the polyethylene descending in said zone. The present invention allows a variety of advantages over the heretofore known methods of carrying out the polymerization of ethylene in the presence of the aforedescribed catalyst and inert solvent. Heretofore the reaction has been carried out with the aid of mechanical stirring in reaction zones having approximately equal height and width. In order to provide sufficient and intimate contact of the catalyst with ethylene generally introduced beneath the surface of the liquid by means of a dip pipe, it has been necessary to stir mechanically the contents of the reaction zone at a relatively rapid rate. While the formation of polymer film has been markedly reduced by polymerizing in the presence of boiling inert solvent as described in the copending application of G. W. Hooker and George O. Napack, Serial No. 513,576, filed June 6, 1955, the required stirring gives rise to polymer build-up on the interior surfaces of the reaction zone, particularly those in the zone of the stirrer. That is, the rapid stirring motion of the stirrer has imparted centrifugal forces to the particles throwing them with considerable force against the walls of the reaction zone causing polymer build-up thereon much as snow drifts build-up. It is to be noted that this polymer build-up is a complication separate and apart from the troublesome film formation.

As the process of the present invention provides a means of polymerizing ethylene without the necessity of mechanical stirring, it obviates the horizontal forces created by the stirrer and thus obviates polymer "build-up." Additionally, as the contents of the reaction zone in the present invention are agitated by the gaseous ethylene introduced and further by the bubbles of gaseous inert solvent formed by vaporization of said solvent by the exothermic heat of polymerization of ethylene, all of the forces acting on the polymer particles are substantially vertical forces which do not in any manner contribute to polymer build-up, and in fact since they act parallelly to the inner boundaries of the reaction zone tend to sweep said boundaries clean of polymer particles.

A further advantage of the process of this invention resides in the fact that there is minimum polymer concentration at the surface of the boiling inert solvent which thus minimizes the possibility of entrainment and fouling of the condenser utilized to condense the vapors of the boiling inert solvent.

One of the features of this invention is that, by introducing inert solvent into the reaction zone below the lowest point of ethylene introduction, there is obtained the advantage of contacting the polyethylene particles in said portion of the reaction zone with fresh inert solvent having minimum catalyst concentration therein. Accordingly, there is provided a means of removing catalyst from the polymer particles. Thus a two-fold advantage obtains: (1) the catalyst is removed from the particle and (2) the catalyst is retained in the reaction zone and is contacted with ethylene as the inert solvent flows upwardly to the zone where ethylene is introduced. This, of course, makes maximum use of a given amount of catalyst by providing the maximum exposure of said catalyst to ethylene.

Yet another feature of this invention resides in the fact that for a given polymer, catalyst or ethylene particle there is a controlled, determinable residence time in the reaction zone. This is to be compared with the heretofore known processes involving mechanical stirring. In such systems generally a vortex exists. Where the system is continuous, there is no assurance of a substantially constant residence time for any polymer, catalyst or ethylene particle. That is, a catalyst particle could be introduced at or about the surface of the inert solvent to be drawn immediately into the vortex and shunted out the bottom of the reaction zone in a very short period of time. On the other hand, there is to be considered the same probability that some particles are retained in the reaction zone for markedly longer periods of time than the average. This can give rise to such difficulties as agglomeration and can, of course, affect physical characteristics such as molecular weight and the like.

On the contrary, in a process of the present invention the residence time varies only slightly with respect to the theoretical average residence time. That is, for example, the variation is in the order of 0–5 percent based on the theoretical average residence time whereas in stirrer equipped vessels the percentage difference based on the theoretical average residence time can be in the order of from about one hundred to several hundred percent.

As the present invention requires a specified depth of liquid above the highest point of ethylene introduction, all of the ethylene introduced is under a hydrostatic head which varies with the height of the liquid level above the lowest point of ethylene introduction. This increases the solubility of ethylene and enables it to polymerize rapidly and effectively. This gives rise to increased ethylene absorption efficiency by providing better contact at lower reactor volume. Thus, for example, utilizing the present invention it is possible to obtain production in the order of 1.5 pounds polyethylene per hour per gallon reactor volume. On the other hand, in the heretofore known methods of polymerizing ethylene utilizing the aforedescribed catalyst, that is in a reaction zone of approximately equal height and width, the rate of production is in the order of 0.3 pound polyethylene per hour per gallon reactor volume. Thus, there is a five-fold advantage in production rate utilizing a process of the present invention and obviously an economic advantage obtains.

In the event that the system is by some circumstance poisoned thus rendering the catalyst reactive, it is obviously less expensive and time-consuming to replace the minimum volume of inert solvent and catalyst utilized in the present invention as compared to the large volume in heretofore known processes.

Yet another feature of the present invention resides in the fact that there is set forth a new and different method of obtaining molecular weight stabilization. One heretofore known method is described and claimed in the copending application of John W. Martin, Serial No. 513,567, filed June 6, 1955, in which recycle of the liquid components of the polymer slurry is utilized. In the present invention it is not necessary to utilize this method of molecular weight stabilization. In the present invention the liquid components of the polymer slurry are at a minimum and, as they contain minimum quantities of catalyst due to the above-described washing of the polymer particles by the inert solvent introduced below the lowest point of ethylene introduction, there is little if any reason for the recycle of said filtrate to the system to accomplish molecular weight stabilization. It is theorized that the control of residence time which can be obtained by the present invention contributes to the molecular weight stabilization.

Since, as mentioned above, the liquid components of the polymer slurry contain little if any catalyst, it is apparent that the process of the present invention makes maximum utilization of catalyst with greater economic advantage. A further advantage resides in the fact that the quantities of catalyst remaining in or on the polymer particles is markedly less than heretofore known. Accordingly, there is less catalyst to remove and/or less catalyst degradation products as contaminants in or to be removed from the product. This is important particularly in those instances in which the catalyst or degradation product thereof is corrosive to mold surfaces if remaining in the polymer product.

As mentioned before, the process of the present invention provides a means of obtaining as a product of the reaction zone a polymer slurry having concentrations of approximately at least twice those which it is possible to obtain when operating in a continuous manner as heretofore known.

Figure 1 is a schematic illustration of one embodiment of the present invention. A substantially vertical reaction zone 11 is shown containing a boiling inert solvent 12. A catalyst is introduced through a dip pipe 14 into the solvent 12 and flows downwardly through the reaction zone. Ethylene is introduced by means of a suitable dispersing means 15 at a point such that the height of inert solvent is at least four times the equivalent diameter of the cross-section area of the plane in which the ethylene is introduced. As used herein the term "equivalent diameter" is used in the sense set forth at page 44 of the 2nd edition of Elements of Chemical Engineering by Badger and McCabe, McGraw-Hill Book Co., New York and London (1936). Alternately, ethylene can be introduced at, for example, a plane above 15 by a dispersing means 15'. This dispersing means 15' is located at such a point that the ratio of the height of inert solvent above it to the equivalent diameter is at least greater than 1:1. As the catalyst and ethylene are contacted in the presence of the inert solvent, an exothermic polymerization occurs which causes the inert solvent to boil, the vapors of which are lead through a conduit 21 to a reflux condenser 22 where they are condensed and collected in a sump 24. The reflux condenser is cooled by any suitable medium, such as, for example, water. A pressure release valve 25 is provided for the control of the pressure on the system. Pump 26 delivers the condensed inert solvent via the conduit 27 to a selected level in the reaction zone which is below the lowest point of ethylene introduction. Alternately, the conduit 27' can be utilized to introduce inert solvent if desired. The valves 28 are provided in the conduits 27 and 27'.

As the polymer is formed upon contact of the ethylene with catalyst, it descends through the reaction zone contacting more ethylene until it reaches the plane of the dispersing means 15 or 15' and undergoing further polymerization. As it reaches the plane of the lowest point of ethylene introduction, it then contacts inert solvent 12 flowing upwardly from the point of introduction, i.e., conduits 27 or 27' and is washed thereby to remove catalyst therefrom. Descending still further, the polymer enters the bottom of the reaction zone which conveniently has sloped or conical sides and is then collected as a slurry 32 of maximum concentration. This slurry is removed from the reaction zone through the quick opening valve 31. The polyethylene is then separated from the liquid components of the slurry by any suitable means such as, for example, centrifugation.

Conveniently, the reaction zone 11 is of circular cross-section in which instance the equivalent diameter is equal to the diameter. However, the process of this invention can be carried out in substantially vertical reaction zones of any shaped cross-section, such as, for example, square, rectangle, triangle, oval and the like. Advantageously, the zones are unobstructed as any obstructions such as, for example, baffles, give rise to the possibility of pocketing or polymer build-up.

Although the reaction zone 11 is not illustrated in Figure 1 as jacketed, it is advantageous to conduct the process of this invention in a zone wherein heat is removed through the walls of the reaction zone as well as by vaporization of the boiling liquid. Removal of heat through the boundaries of the reaction zone serves a plurality of purposes. First, if the coolant is introduced at the bottom of the zone and flowed upwardly through a jacket, the coolest inert solvent in the reaction zone is at the bottom portion thereby reducing the solubility of polyethylene therein. Additionally, if bubbles of vaporized inert solvent are generated below the surface of said solvent and contact the boundaries of the reaction zone heat is given up thereto and the solvent condensed. This generation and collapsing of polymer bubbles contributes to the agitation of the contents of the reaction zone as well as to agitation at the boundary surface thereby acting as a preventative of any polymer film formation or polymer build-up at said zone boundaries.

*Example I*

A 2½-foot diameter tube 35 feet high, jacketed over substantially its entire height and equipped at the top with a non-return reflux condenser and at the bottom with a quick opening valve, is filled approximately 95% full with pentane at its boiling point, that is, to a level of about 32 feet above said valve. The lower section of the tube, that is, approximately 5 feet, is in the form of an inverted cone at the bottom of which is located the valve. The sump of the reflux condenser is attached to a pump which delivers pentane to the tube at a height of approximately 7 feet above said valve.

There is introduced through a dip pipe extending slightly below the pentane surface a 1:1 molar ratio catalyst of diethylaluminum chloride and titanium tetrachloride at a rate of 6 pounds per hour. Ethylene is introduced into the central portion of the tube through nozzles located respectively at heights of 10, 15 and 18 feet above said valve at a rate of approximately 840 pounds per hour total. Approximately 50% of the ethylene is introduced through the lowest nozzle; about 35% through the intermediate nozzle and about 15% through the highest nozzle.

An exothermic polymerization occurs. The heat of reaction is removed by boiling the pentane. Approximately 12,600 pounds pentane per hour are evaporated, condensed and returned to the system from the condenser sump by means of the pump, together with approximately 2900 pounds pentane as make-up for that removed as polymer slurry as described below. A pressure release valve is provided at the top of the reflux condenser whereby the pressure in the system is maintained at approximately 22 p.s.i.g. This maintains a temperature in the upper portion of the reaction zone in the range approximately 60–64° C.

At the end of approximately ten minutes addition of ethylene, the quick opening valve at the bottom of the reactor is opened intermittently for approximately three seconds each minute. There is removed from the reactor by this means approximately 840 pounds polyethylene per hour slurried with 2900 pounds pentane. This corresponds to a slurry of approximately 1.5 pounds polyethylene per gallon pentane. The slurry is vented into a pressurized vessel and the polyethylene separated from the liquid pentane. It is noted that this pentane contains only minimum amounts of active catalyst.

This example is illustrative of the production of 0.6 pound polyethylene per hour per gallon reactor volume. It is further to be noted that the liquid level is maintained at a height above the lowest point of polyethylene introduction, as compared to the equivalent diameter of the tube at said point of ethylene introduction of approximately 9. Similarly, the ratio between the height of liquid level above the highest point of ethylene introduction and the equivalent diameter at the point of said ethylene introduction is approximately 5.6.

*Example II*

The procedure of Example I is repeated and there is circulated through the jacket water at an inlet temperature of 20° C. at a rate to maintain an outlet temperature of 28° C. This allows the introduction of ethylene at a total rate of 1300 pounds per hour. The rate of catalyst addition and the rate of make-up pentane addition is correspondingly increased. Thus, for example, the valve is now opened each minute for approximately 4½ seconds whereby there is removed 1300 pounds polyethylene slurried with 4500 pounds pentane per hour.

This procedure illustrates the production of polyethylene at 1.0 pound per hour per gallon reactor volume. It is to be noted that the amount of condensate received by the reflux condenser is the same as is observed in Example I. The increased capacity is counted for by the removal of heat of reaction through the reaction zone boundaries.

*Example III*

To an 1100 gallon jacketed reaction vessel having a height approximately equal its diameter and equipped with a reflux condenser and an anchor-type stirrer, there is added 1000 gallons pentane containing about 10 pounds of a 1:1 molar ratio admixture of the catalyst of Example I. Stirring is commenced and ethylene is introduced in to the reaction vessel through a dip pipe, the outlet of which is located at a depth such that the ratio of said depth to the equivalent diameter of the vessel is approximately 0.8. It is to be noted that this is essentially the lowest feasible point of ethylene introduction in said vessel. Ethylene is introduced at a rate of approximately 167 pounds per hour. At the end of approximately 4¾ hours, there is contained in the reaction vessel a slurry of approximately 0.66 pound polyethylene per gallon pentane.

The addition of ethylene and catalyst is continued at the rate aforedescribed and there is commenced the removal from the bottom portion of the reaction vessel of slurry at a rate of approximately 167 pounds polyethylene in 1330 pounds pentane per hour. This example illustrates the production of polyethylene at a rate of 0.15 pound per hour per gallon reactor volume. This is to be compared to the specific rates 0.66 in Example I and 1.0 in Example II which are obtained utilizing the process of this invention.

*Example IV*

Example I is repeated with the following exceptions. The liquid level is maintained at a height of approximately 20' above the valve. Ethylene is introduced in the two lower nozzles, that is, those located at heights of 10 and 15' respectively above said valve. Catalyst is introduced at a rate of 3.7 pounds per hour. Ethylene is introduced at an overall rate of 525 pounds, 400 pounds through the lower nozzle and 125 pounds through the nozzle located 15' above the valve. The valve is opened intermittently for approximately 2 seconds each minute. There is obtained polyethylene in an amount of 525 pounds per hour.

This example illustrates the production of polyethylene at a rate of approximately 0.72 pound per hour per gallon inert solvent. It will be noted that the liquid level is maintained at a height above the lowest point of ethylene introduction such that the ratio of this height to the equivalent diameter, that is 2.5', is 4.0. The ratio of the height of liquid level above the highest point of ethylene introduction to the equivalent diameter is 2.0.

While the foregoing examples illustrate solely the use of a catalyst which is an admixture of diethylaluminum chloride and titanium tetrachloride, it will be realized that the polymerization of this invention can be conducted in the presence of any of the catalysts described broadly at page one of the specification.

Among the preferred catalysts are the diethylaluminum chloride-titanium tetrachloride (1:1 molar ratio), as well as the di-iso-butylaluminum chloride-titanium tetrachloride (1:1 ratio) mixtures. Further mixtures of titanium tetrachloride and di-iso-butylaluminum hydride, triethylaluminum, tributylaluminum and trioctylaluminum give superior results. Titanium oxychloride and titanium acetylacetonate when substituted for titanium tetrachloride give excellent results. Preferably these catalysts are utilized in amounts of about 5-15 millimols per liter solvent. Broadly, the molar ratio of component (A) to component (B) can be varied in the range of from about 0.5:1 to 12:1 to yield a variety of polyethylenes. Preferably the ratio is in the range 0.75:1 to 2:1.

The various catalyst mixtures, embraced by the description of (A) and (B) supra can be substituted in Examples I and II to yield substantially similar results. Of course, variation of catalyst components, amount and molar ratio will affect the molecular weight of the polyethylene produced. The catalyst can be introduced into the reaction zone either as a mixture of components (A) and (B) or these components can be introduced in separate streams in amounts to produce the desired ratio and amount of catalyst in the reaction zone. Substitution of similar quantities of 1:1 molar ratio catalyst admixtures of titanium tetrachloride and di-iso-butylaluminum chloride, di-iso-butylaluminum hydride, triethylaluminum, tributylaluminum, and trioctylaluminum in the foregoing examples for the titanium tetrachloridediethylaluminum chloride there used yields substantially similar results as to the amount of polyethylene produced per unit time per unit reactor volume.

Similarly, such inert solvents as hexane, heptane, propane, xylene and the like and mixtures thereof, can be utilized and the boiling point varied by operation under sub- or superatmospheric pressure as is necessary dependent upon the boiling point at atmospheric pressure of the selected solvents. Particularly, desirable results are obtained utilizing pentane as the inert hydrocarbon and operating at a pressure in the range of 10 to 30 p.s.i.g.

Operation of the process of this invention can be carried out at either sub- or superatmospheric pressure as well as at atmospheric pressure. In general, excellent results are obtained utilizing the aforedescribed catalysts in the presence of the aforedescribed solvent at such a pressure that their boiling points are in the range 50–85° C. Further, mixtures of organic solvents can be utilized. Thus, a higher boiling solvent such as, for example, heptane, can be used in combination with, for example, butane and the pressure controlled to allow the butane to boil in the temperature range 50–85° C. and thus remove the heat of reaction. In such case the butane will be vaporized to remove the heat of reaction, condensed, and returned to the system where it again vaporizes to provide agitation as aforedescribed and to effect further removal of the heat of vaporization.

While Examples I and II illustrate carrying out the process of the invention in a 2.5 foot I.D. tube 35 feet in height, it is to be noted that the process of the invention can be carried out in any apparatus wherein the aforedescribed process steps can be accomplished. Of particular importance is the step of maintaining a height of inert solvent above the lowest point of ethylene introduction such that this height is at least four times the equivalent diameter of the cross-sectional area in the plane of lowest ethylene introduction. As is illustrated in Examples I and II, ethylene can be introduced at various points above the lowest point of ethylene introduction, for example, up to such point that the ratio between the height of inert solvent above said point to the equivalent diameter of the cross-sectional area of the plane of ethylene introduction is at least greater than 1:1.

While Example III illustrates introducing ethylene while maintaining a height of solvent thereabove such that the ratio of said height to the equivalent diameter of the cross-sectional area of the plane of ethylene introduction is about 1:1, it is to be realized that, in the process of the present invention, the agitation accomplished by the ethylene introduced at such a depth that the ratio of height to the equivalent diameter is at least 4, allows the introduction of ethylene at such a point that the ratio height of liquid above such point to the equivalent diameter is greater than but approaches 1:1 at a greater rate and a greater absorption efficiency than heretofore known. In addition, it is to be noted that at least a major portion of the ethylene introduced into the system should be introduced at the lowest point of ethylene introduction. Minor portions of the ethylene can then be introduced above such point and provided that the ratio of height of liquid above the highest point of introduction to the equivalent diameter is greater than 1:1.

The rate at which ethylene can be polymerized utilizing the process of this invention is limited only by the rate at which flooding will occur in whatever type and size reaction zone the polymerization is conducted in. Provided the aforedescribed liquid level is maintained at a height above the lowest point of ethylene introduction as compared to the equivalent diameter of the reaction zone in the plane of ethylene introduction, it is possible to polymerize ethylene at a maximum rate of introduction, approaching but, of course, not equaling that rate at which flooding effect occurs.

As mentioned above, substantially vertical reactors of cross-sections other than circular cross-sections can be utilized in place of the apparatus having a circular cross-section illustrated in Examples I and II. It will be understood that regardless of the particular shape, the perimeter of the cross-sectional area of the apparatus will equal the "wetted perimeter" utilized in determining equivalent diameter since in all instances the reactor at any plane of ethylene introduction will be filled with inert solvent.

It will further be noted that while Examples I and II illustrate carrying out the process of this invention in a tubular reactor which is approximately 95% filled with organic solvent as aforedescribed, there is nothing to prevent the process being carried out in such a manner that the inert solvent occupies less volume, for example, only 50% of the reactor volume. In such instance, the interior surface of the jacketed reactor acts to condense vapors and return them as liquid to the lower portion of the reaction zone. Thus, the process can be carried out in a wide variety of different type reactors.

In the event the process of the invention is carried out in a reactor which is only approximately 50% filled with solvent there is of course a diminution in the rate of production of ethylene expressed in pounds per hour per gallon reactor volume so that it is desirable to operate as described in Examples I and II with a maximum amount of inert solvent. It will be noted, however, that even operating with only 50% of the reactor volume filled with solvent that markedly increased production rates are obtained as compared to the heretofore known production rates in stirrer equipped vessels of approximately equal heights and widths.

Advantageously the reaction is carried out in a zone having minimum diameter commensurate with the production rate desired. In such an instance there is provided maximum cooling surface per unit reactor volume.

While the invention has been described with reference to particular embodiments thereof, it will be understood that in its broadest aspects the invention may be variously embodied within the scope of the invention as set forth herein and in the appended claims.

What is claimed is:

1. In a process for producing solid polyethylene by contacting ethylene and a catalyst in a reaction zone in the presence of an inert organic liquid solvent at a temperature below the catalyst decomposition temperature and under pressures of less than 100 atmospheres, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl and aryl radicals, halogen atoms, alkyloxy radicals, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV-B, V-B and VI-B of the periodic system including thorium and uranium, the polymerization of ethylene being an exothermic reaction, the improvement which comprises maintaining a constant temperature in said reaction zone by boiling said solvent; continuously adding catalyst to the upper portion of said zone to flow downwardly therethrough; continuously introducing ethylene below the surface of said solvent to flow countercurrently to the flow of said catalyst; maintaining by the addition of solvent a level of liquid in the reaction zone above the lowest point of ethylene introduction at a distance of at least four times the equivalent diameter of the cross-sectional area of the zone in the plane of said lowest point of ethylene introduction; and removing solid polyethylene from the bottom of said zone.

2. A process of claim 1 in which the density of said solvent is in the range 0.55–0.90.

3. A process of claim 1 in which said solvent is pentane.

4. A process of claim 1 in which vapors of the boiling solvent are condensed and returned to said reaction zone at a point below the lowest point of ethylene introduction.

5. A process of claim 4 in which said solvent is pentane.

6. A process of claim 1 in which the inert solvent comprises a mixture of heptane and butane.

7. A process of claim 1 in which the inert solvent comprises a mixture of heptane and propane.

8. A process of claim 1 in which the major portion of the ethylene introduced into the reaction zone is introduced at the lowest point of ethylene introduction and in which there is maintained above the highest point of ethylene introduction a liquid level at a distance of at least greater than one times the equivalent diameter of the cross-sectional area of the zone in the plane of said highest point of ethylene introduction.

9. A process of claim 1 in which the catalyst is a 1:1 molar ratio mixture of diethylaluminum chloride and titanium tetrachloride and in which these components are introduced separately.

10. A process of claim 1 in which the catalyst is a 1:1 molar ratio mixture of di-iso-butyl chloride and titanium tetrachloride and in which these components are introduced separately.

11. A process of claim 1 in which the catalyst is a 1:1 molar ratio mixture of di-iso-butylaluminum hydride and titanium tetrachloride and in which these components are introduced separately.

12. A process of claim 1 in which the catalyst is a 1:1 molar ratio mixture of triethylaluminum and titanium tetrachloride and in which these components are introduced separately.

13. A process of claim 1 in which the catalyst is a 1:1 molar ratio mixture of tributylaluminum and titanium tetrachloride and in which these components are introduced separately.

14. In a process for the polymerization of ethylene to solid polyethylene by contacting ethylene and a catalyst in a reaction zone in the presence of an organic liquid solvent at a temperature below the catalyst decomposition temperature and under pressures of less than 100 atmospheres, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl and aryl radicals, halogen atoms, alkyloxy radicals, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV-B, V-B and VI-B of the periodic system including thorium and uranium, said polymerization being an exothermic reaction the improvement which comprises removing the heat of said exothermic reaction by boiling said solvent; continuously adding catalyst to the upper portion of said zone to flow downwardly therethrough; continuously introducing ethylene below the surface of said solvent to flow countercurrently to the flow of said catalyst; maintaining the level of liquid in the reaction zone above the lowest point of ethylene introduction at a distance of at least four times the equivalent diameter of the cross-sectional area of the zone in the plane of said lowest point of ethylene introduction by the addition of said solvent; collecting said polyethylene in the bottom of said reaction zone in the form of a high concentration slurry; removing said slurry; from said zone and separating said polyethylene from said slurry.

15. In a process for the polymerization of ethylene to solid polyethylene by contacting ethylene and a catalyst in a reaction zone in the presence of an inert organic liquid solvent at a temperature below the catalyst decomposition temperature and under pressures of less than 100 atmospheres, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, alkyl and aryl radicals, halogen atoms, alkyloxy radicals, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV-B, V-B and VI-B of the periodic system including thorium and uranium, said polymerization being an exothermic reaction the improvement which comprises maintaining said reaction zone substantially vertical; removing the heat of said exothermic reaction by boiling said solvent; continuously adding said catalyst to the upper portion of said zone to flow downwardly therethrough; continuously introducing ethylene below the surface of said inert solvent to flow countercurrently to the flow of said catalyst; maintaining the level of said liquid in the reaction zone above the lowest point of ethylene introduction at a distance of at least four times the equivalent diameter of the cross-sectional area of the zone in the plane of said lowest point of ethylene introduction; introducing a sufficient quantity of said solvent to maintain the said level, at a point below the lowest point of ethylene introduction whereby catalyst is removed from said polyethylene descending in said zone; collecting polyethylene at the bottom of said zone in the form of a high concentration flowable slurry having minimum catalyst concentration therein due to the content of said polyethylene with said last mentioned solvent; removing said slurry from said zone and separating polyethylene therefrom.

References Cited in the file of this patent

UNITED STATES PATENTS

| | | |
|---|---|---|
| 2,414,311 | Larson | Jan. 14, 1947 |
| 2,692,257 | Zletz | Oct. 19, 1954 |
| 2,719,143 | Van Dijk | Sept. 27, 1955 |
| 2,721,189 | Anderson | Oct. 18, 1955 |
| 2,755,324 | Mueller | July 17, 1956 |